United States Patent
Horii et al.

(10) Patent No.: US 10,116,178 B2
(45) Date of Patent: Oct. 30, 2018

(54) ROTOR WITH EMBEDDED PERMANENT MAGNET HAVING ADHESIVE ON ONE SIDE AND COOLING CHANNELS ON THE OTHER SIDE

(71) Applicant: Mitsubishi Electric Corporation, Tokyo (JP)

(72) Inventors: Masaki Horii, Tokyo (JP); Masaya Inoue, Tokyo (JP); Yoshiaki Kitta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 87 days.

(21) Appl. No.: 15/032,175

(22) PCT Filed: Dec. 13, 2013

(86) PCT No.: PCT/JP2013/083488
§ 371 (c)(1),
(2) Date: Apr. 26, 2016

(87) PCT Pub. No.: WO2015/087445
PCT Pub. Date: Jun. 18, 2015

(65) Prior Publication Data
US 2016/0261158 A1 Sep. 8, 2016

(51) Int. Cl.
*H02K 1/32* (2006.01)
*H02K 1/27* (2006.01)
(Continued)

(52) U.S. Cl.
CPC .............. *H02K 1/32* (2013.01); *H02K 1/274* (2013.01); *H02K 1/2766* (2013.01); *H02K 1/28* (2013.01);
(Continued)

(58) Field of Classification Search
CPC ........ H02K 1/32; H02K 1/2766; H02K 1/274; H02K 1/28; H02K 9/19
(Continued)

(56) References Cited

U.S. PATENT DOCUMENTS 7,705,503 B2 * 4/2010 Takahashi ................ H02K 1/32
310/156.53
8,242,646 B2 * 8/2012 Tatematsu ............. B60L 3/0061
310/52

(Continued)

FOREIGN PATENT DOCUMENTS

CN 203104159 U 7/2013
EP 0 909 003 A2 4/1999
(Continued)

OTHER PUBLICATIONS

International Search Report of PCT/JP2013/083488 dated Mar. 4, 2014.
(Continued)

*Primary Examiner* — Naishadh Desai
(74) *Attorney, Agent, or Firm* — Sughrue Mion, PLLC; Richard C. Turner (57) ABSTRACT

A coolant flow channel is formed so as to pass axially through a rotor core radially inside magnet housing apertures, a linking flow channel is formed so as to have a flow channel width that is narrower than a maximum flow channel width of the coolant flow channel, so as to link the coolant flow channel and the magnet housing apertures, and so as to pass axially through the rotor core, and permanent magnets are fixed to an inner wall surface of the magnet housing apertures by an adhesive that is disposed only between a wall surface of the permanent magnets that is positioned on a radially outer side and the inner wall surface of the magnet housing apertures so as to expose a region of
(Continued)

a wall surface of the permanent magnets that is positioned on a radially inner side that faces the linking flow channel.

7 Claims, 6 Drawing Sheets

(51) Int. Cl.
    *H02K 1/28*     (2006.01)
    *H02K 9/19*     (2006.01)

(52) U.S. Cl.
    CPC ........... *H02K 9/19* (2013.01); *H02K 2201/06* (2013.01); *H02K 2213/03* (2013.01)

(58) Field of Classification Search
    USPC ............................................... 310/52–64, 89
    See application file for complete search history.

(56) References Cited

U.S. PATENT DOCUMENTS

| | | | | |
|---|---|---|---|---|
| 2010/0237725 A1* | 9/2010 | Tematsu | ................ | H02K 1/32 310/61 |
| 2011/0254474 A1* | 10/2011 | Saito | ........................ | H02K 1/24 318/139 |
| 2012/0025642 A1* | 2/2012 | Onimaru | ................ | H02K 1/276 310/64 |
| 2012/0299403 A1* | 11/2012 | Stahlhut | ............... | H02K 1/2766 310/59 |
| 2013/0285500 A1 | 10/2013 | Kinashi | | |

FOREIGN PATENT DOCUMENTS

| | | | |
|---|---|---|---|
| EP | 1 953 896 A1 | 8/2008 |
| EP | 2 448 094 A1 | 5/2012 |
| EP | 2 528 197 A2 | 11/2012 |
| EP | 2 562 914 A1 | 2/2013 |
| JP | 2011-259691 A | 12/2011 |
| JP | 2013-017297 A | 1/2013 |
| JP | 2013-183480 A | 9/2013 |
| JP | 2013-183483 A | 9/2013 |
| JP | 2013-192339 A | 9/2013 |
| WO | 2013/136405 A1 | 9/2013 |

OTHER PUBLICATIONS

Communication dated Jun. 19, 2017 from the European Patent Office in counterpart application No. 13899228.4.

* cited by examiner

ROTOR WITH EMBEDDED PERMANENT MAGNET HAVING ADHESIVE ON ONE SIDE AND COOLING CHANNELS ON THE OTHER SIDE

CROSS REFERENCE TO RELATED APPLICATIONS

This is a National Stage of International Application No. PCT/JP2013/083488 filed Dec. 13, 2013, the contents of which are incorporated herein by reference in its entirety.

TECHNICAL FIELD

The present invention relates to an embedded permanent magnet rotary electric machine in which permanent magnets are embedded in an outer circumferential side of a rotor core, and particularly relates to a cooling construction for the permanent magnets that are embedded in the rotor core.

BACKGROUND ART

In conventional embedded permanent magnet rotary electric machines, permanent magnets have been disposed inside cavities that are formed in a rotor core so as to extend in a direction of a rotational axis, resin members have been formed so as to completely cover inner wall surfaces of the cavities, and the permanent magnets have been cooled by passing a liquid coolant through cooling flow channels that have a tubular construction that are formed by the inner wall surfaces of the resin member and surfaces of the permanent magnets (see Patent Literature 1, for example).

CITATION LIST

Patent Literature

Patent Literature 1: Japanese Patent Laid-Open No. 2013-17297 (Gazette)

SUMMARY OF THE INVENTION

Problem to be Solved by the Invention

However, in conventional embedded permanent magnet rotary electric machines, the rotor core, the permanent magnets, and cores that form the cooling flow channels are disposed inside a mold, a liquid resin is poured in, and the resins are set to form the resin members. Thus, because the resin members are formed so as to completely cover the inner wall surfaces of the cavities, increasing the thickness of the resin members, if the cross-sectional area of the permanent magnets is ensured, the cross-sectional shapes of the cavities are increased in proportion to the spaces in which the resin members are formed. Thus, because distances between the permanent magnets and the inner wall surfaces of the cavities are increased, magnetic resistance between the permanent magnets and the rotor core is increased, reducing the amount of magnetic flux from the permanent magnets, and one problem has been that high torque cannot be achieved.

The present invention aims to solve the above problems and an object of the present invention is to provide an embedded permanent magnet rotary electric machine that suppresses reductions in magnetic flux from permanent magnets by reducing usage of adhesive that fixes the permanent magnets to an inner wall surface of magnet housing apertures, reducing cross-sectional area of the magnet housing apertures while ensuring magnet cross-sectional area, and shortening distances between the inner wall surfaces of the magnet housing apertures and the permanent magnets, and that can also cool permanent magnets effectively by configuring cooling flow channels such that a coolant cools the permanent magnets directly.

Means for Solving the Problem

An embedded permanent magnet rotary electric machine according to the present invention includes: a stator including: an annular stator core; and a stator coil that is mounted to the stator core; and a rotor including: a rotor core that is configured by laminating and integrating electromagnetic steel sheets, and that is fixed to a shaft so as to be disposed rotatably inside the stator core; a plurality of permanent magnet housing apertures that are disposed circumferentially so as to be respectively formed so as to pass axially through an outer circumferential side of the rotor core; and permanent magnets that are housed in each of the magnet housing apertures. At least one coolant flow channel is formed so as to pass axially through the rotor core radially inside the magnet housing apertures, a linking flow channel is formed so as to have a flow channel width that is narrower than a maximum flow channel width of the coolant flow channel, so as to link the coolant flow channel and the magnet housing apertures, and so as to pass axially through the rotor core, and the permanent magnets are fixed to an inner wall surface of the magnet housing apertures by an adhesive that is disposed only between a wall surface of the permanent magnets that is positioned on a radially inner side or a radially outer side of the permanent magnets and the inner wall surface of the magnet housing apertures so as to expose a region of a wall surface of the permanent magnets that is positioned on a radially inner side that faces the linking flow channel.

Effects of the Invention

According to the present invention, because the adhesive is disposed only between the wall surface of the permanent magnets that is positioned on a radially inner side or a radially outer side and the inner wall surface of the magnet housing apertures, the amount of adhesive used is reduced, enabling the cross-sectional area of the magnet housing apertures to be reduced while ensuring magnet cross-sectional area. Thus, distances between the permanent magnets and the inner wall surfaces of the magnet housing apertures are shortened, suppressing increases in magnetoresistance between the permanent magnets and the rotor core. Reductions in the amount of magnetic flux from the permanent magnets that result from increases in magnetoresistance can thereby be suppressed, enabling increased torque to be achieved.

Because the regions of the wall surfaces of the permanent magnets that are positioned on a radially inner side that face the linking flow channel are exposed, coolant that flows through the linking flow channel contacts the permanent magnets directly, enabling the permanent magnets to be cooled effectively.

DESCRIPTION OF EMBODIMENTS

Preferred embodiments of an embedded permanent magnet rotary electric machine according to the present invention will now be explained with reference to the drawings.
Embodiment 1

Figure 1:
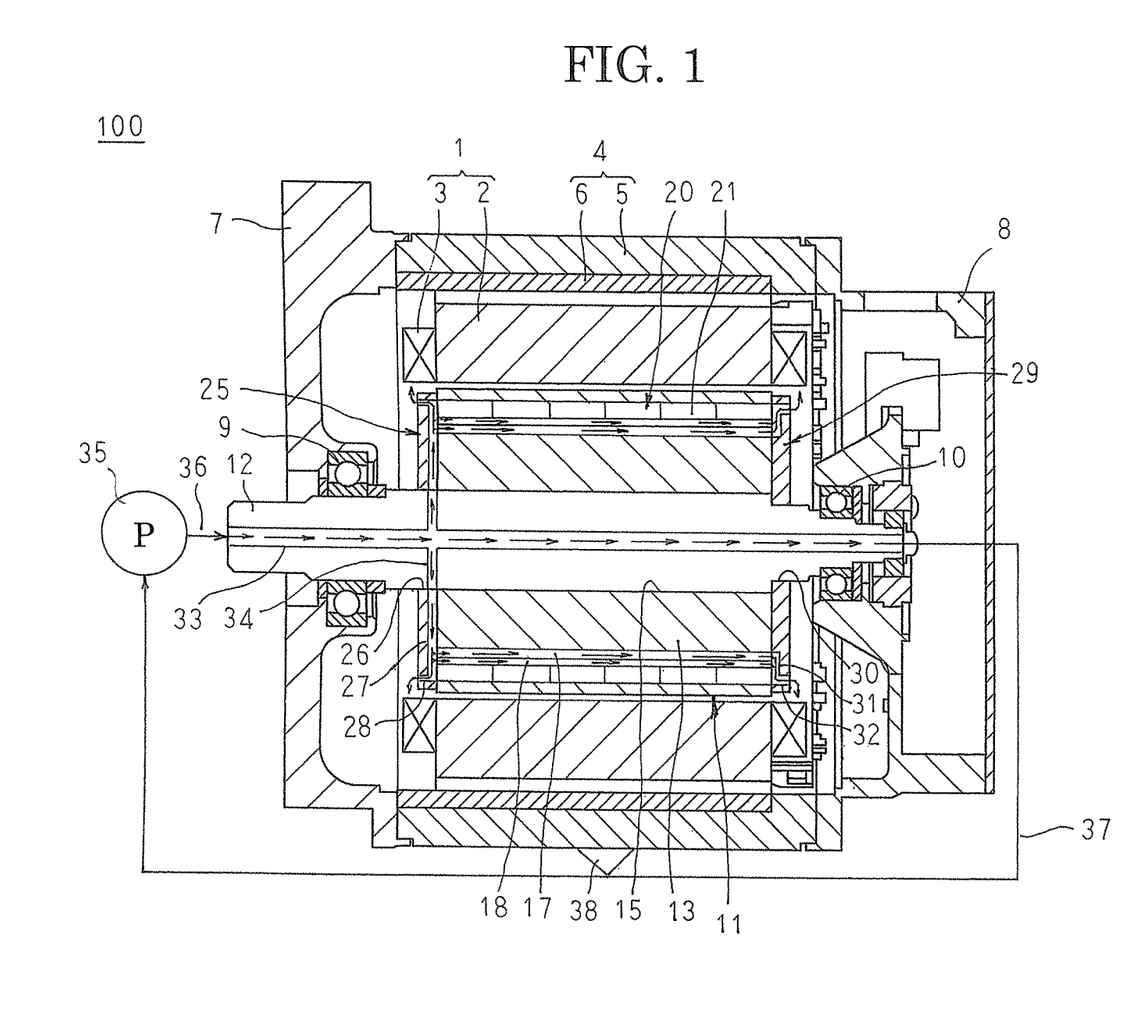
FIG. 1 is a cross section that shows an embedded permanent magnet rotary electric machine according to Embodiment 1 of the present invention.
Figure 2:
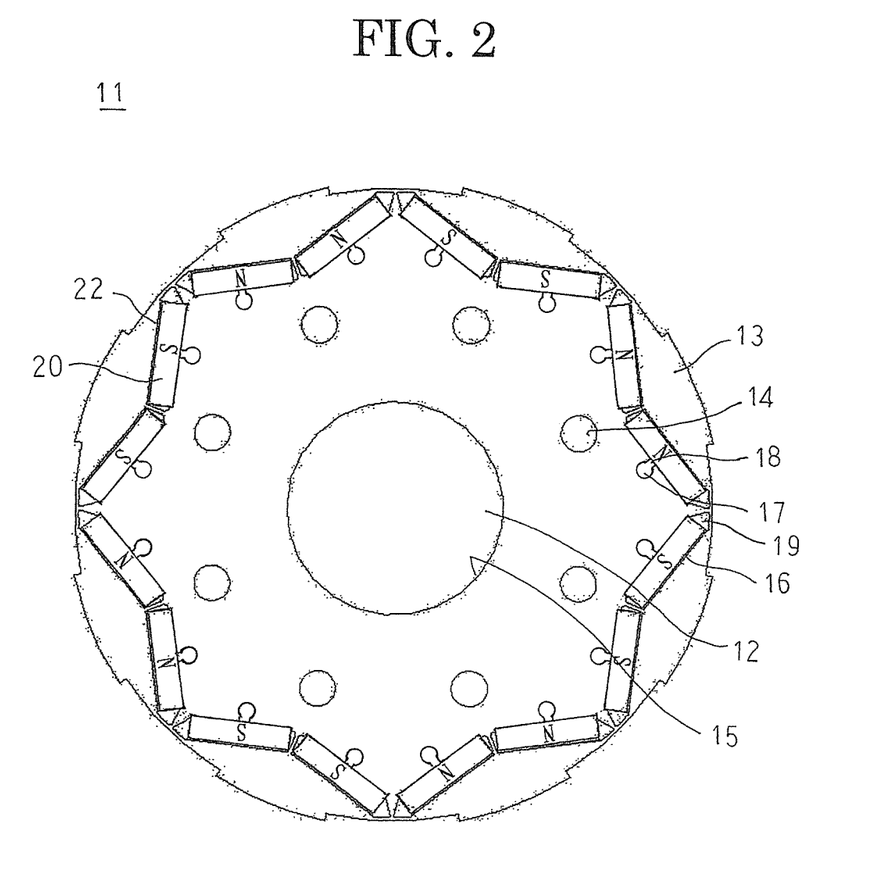
FIG. 2 is an end elevation that shows a rotor core in the embedded permanent magnet rotary electric machine according to Embodiment 1 of the present invention.
Figure 3:
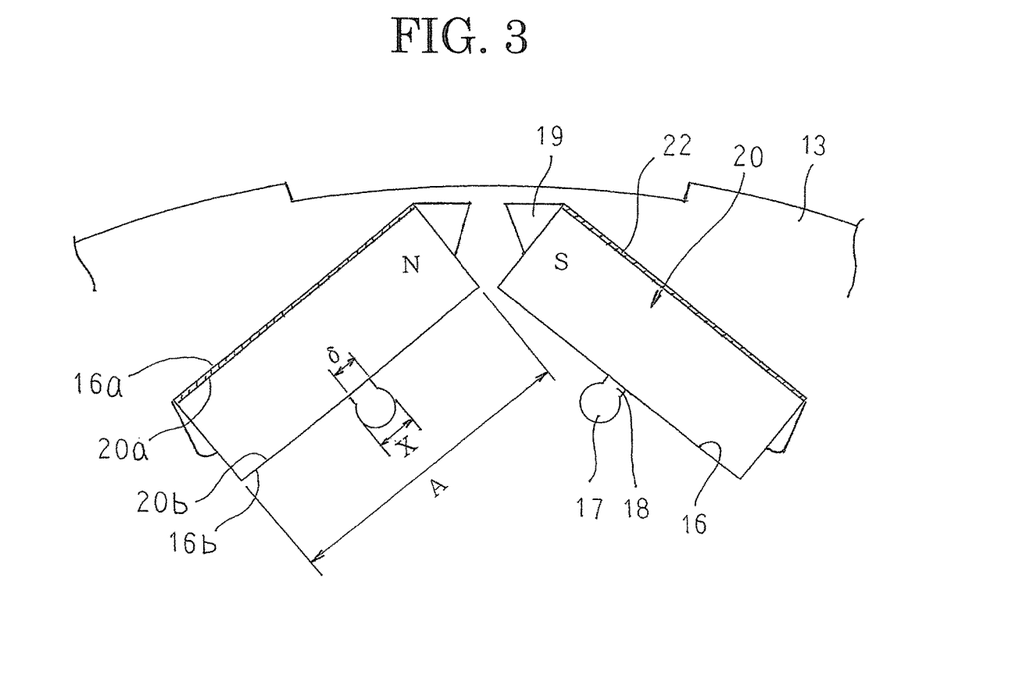
FIG. 3 is a partially enlarged end elevation that shows the rotor core in the embedded permanent magnet rotary electric machine according to Embodiment 1 of the present invention.

FIG. 1 is a cross section that shows an embedded permanent magnet rotary electric machine according to Embodiment 1 of the present invention, FIG. 2 is an end elevation that shows a rotor core in the embedded permanent magnet rotary electric machine according to Embodiment 1 of the present invention, and FIG. 3 is a partially enlarged end elevation that shows the rotor core in the embedded permanent magnet rotary electric machine according to Embodiment 1 of the present invention. Moreover, the arrows in FIG. 1 represent cooling oil flow. In FIG. 3, A is a length of a long side of a rectangular cross sections of a magnet housing aperture 16, X is a maximum flow channel width of a coolant flow channel 17, and δ is a flow channel width of a linking flow channel 18.

In FIGS. 1 through 3, an embedded permanent magnet rotary electric machine 100 includes: an annular stator 1; a cylindrical frame 4 inside which the stator 1 is housed and held; a front frame 7 and a rear frame 8 that respectively include bearings 9 and 10, that are disposed at two axial ends of the frame 4, and that together with the frame 4 form a sealed space; a rotor 11 that is rotatably disposed inside the stator 1 such that a shaft 12 is supported by the bearings 9 and 10; and an external oil pumping mechanism 35.

The stator 1 has: an annular stator core 2; and a stator coil 3 that is mounted to the stator core 2. The frame 4 is formed by press-fitting and integrating a cylindrical inner frame 6 that is made of aluminum inside a cylindrical outer frame 5 that is made of iron. The stator core 2 to which the stator coil 3 has been mounted is pressed into and fixed inside the frame 4 to assemble the stator 1.

The rotor 11 includes: an annular rotor core 13; the shaft 12, which is press-fitted into and fixed to a shaft insertion aperture 15 that is formed so as to pass through a central axial position of the rotor core 13; sixteen permanent magnets 20 that are each mounted so as to pass through an outer circumferential side of the rotor core 13; and a first end plate 25 and a second end plate 29 that are press-fitted onto and fixed to the shaft 12, and that are disposed so as to contact two axial end surfaces of the rotor core 13.

The rotor core 13 is produced by laminating and integrating annular core laminations that are punched from a thin electromagnetic steel sheet so as to be positioned by penetrating apertures 14, and has a shaft insertion aperture 15 that passes through a central position. Eight pairs of magnet housing apertures 16 are respectively formed at a uniform pitch in a circumferential direction so as to pass axially through an outer circumferential side of the rotor core 13 such that cross sections that are perpendicular to an axial direction of the shaft 12 have an approximately rectangular shape that is constant in the axial direction. The pairs of magnet housing apertures 16 are disposed in V shapes that open out toward a radially outer side.

Coolant flow channels 17 that have circular cross sections are formed so as to pass axially through the rotor core 13 centrally in longitudinal directions of long sides of the rectangular cross sections of the magnet housing apertures 16 so as to be spaced apart from the magnet housing apertures 16 radially inside the magnet housing apertures 16. Linking flow channels 18 are formed so as to extend from a first axial end to a second axial end of the rotor core 13 so as to link the magnet housing apertures 16 and the coolant flow channels 17. The flow channel width δ of the linking flow channel 18 is narrower than the maximum flow channel width X, i.e., the diameter, of the coolant flow channels 17. Air gaps 19 are also formed so as to pass axially through the rotor core 13 at two longitudinal ends of the long sides of the rectangular cross sections of the magnet housing apertures 16, and function as flux barriers that control the flow pathways of magnetic flux inside the rotor core 13.

Here, portions of inner wall surfaces of the magnet housing apertures 16 that are positioned on a radially outer side will be designated "outside wall surfaces 16a", and portions that are positioned on a radially inner side will be designated "inside wall surfaces 16b". In other words, the outside wall surfaces 16a are inner wall surfaces that are constituted by long sides that are on a radially outer side of the rectangular cross sections of the magnet housing apertures 16, and the inside wall surfaces 16b are inner wall surfaces that are constituted by long sides that are on a radially inner side of the rectangular cross sections. Longitudinal directions of the long sides of the rectangular cross sections of the magnet housing apertures 16 will be designated "width directions".

The permanent magnets 20 have cross sections perpendicular to an axial direction of the shaft 12 that are rectangular shapes, and are housed in the respective magnet housing apertures 16. Here, portions of surfaces of the permanent magnets 20 that are positioned on a radially outer side will be designated "outside wall surfaces 20a", and portions that are positioned on a radially inner side will be designated "inside wall surfaces 20b". In other words, outside wall surfaces 20a are surfaces that are constituted by long sides that are on a radially outer side of the rectangular cross sections of the permanent magnets 20, and the inside wall surfaces 20b are surfaces that are constituted by long sides that are on a radially inner side of the rectangular cross sections. Longitudinal directions of the long sides of the cross sections of the permanent magnets 20 will be designated "width directions".

When housed in the magnet housing apertures 16, only the outside wall surfaces 20a of the permanent magnets 20 are fixed adhesively to the outside wall surfaces 16a of the magnet housing apertures 16 using an adhesive 22. The inside wall surfaces 20b of the permanent magnets 20 contact the inside wall surfaces 16b of the magnet housing apertures 16, and are also exposed to the coolant flow channels 17 by means of the linking flow channels 18.

Pairs of the permanent magnets 20 that are housed in the pairs of magnet housing apertures 16 are magnetized so as to have identical magnetic poles. Eight pairs of the permanent magnets 20 are disposed such that different magnetic poles alternate circumferentially. In this case, the permanent magnets 20 are configured by arranging in a single row in the axial direction six magnet blocks 21 that are formed so as to have strip shapes that have cross sections perpendicular to an axial direction of the shaft 12 that are rectangular shapes.

The first end plate 25 is produced into a ring-shaped flat plate that has an outside diameter that is approximately equal to an outside diameter of the rotor core 13, and that has a shaft insertion aperture 26 at a central position. An inlet flow channel 27 is formed by hollowing out a first surface of the first end plate 25 to a constant depth so as to leave an outer circumferential edge portion thereof. Sixteen first discharging channels 28 are formed at a uniform pitch circumferentially so as to each pass axially through the first end plate 25 so as to link between an outer circumferential portion of the inlet flow channel 27 and a second surface side of the first end plate 25.

The shaft 12 is passed through the shaft insertion aperture 26, and the first end plate 25 is fixed by press-fitting onto the shaft 12 from a first axial end such that the first surface faces toward the rotor core 13. The first surface of the first end plate 25 contacts a first axial end surface of the rotor core 13 such that the opening of the inlet flow channel 27 is closed. The coolant flow channels 17 and the linking flow channels 18 that are formed on the rotor core 13 are connected to the inlet flow channel 27. The first discharging channels 28 are positioned radially outside each of the coolant flow channels 17.

The second end plate 29 is produced into a ring-shaped flat plate that has an outside diameter that is approximately equal to an outside diameter of the rotor core 13, and that has a shaft insertion aperture 30 at a central position. An inlet flow channel 31 is formed by hollowing out a first surface of the second end plate 29 to a constant depth so as to leave an outer circumferential edge portion thereof. Sixteen second discharging channels 32 are formed at a uniform pitch circumferentially so as to each pass axially through the second end plate 29 so as to link between an outer circumferential portion of the inlet flow channel 31 and a second surface side of the second end plate 29. In this case, the second end plate 29 is formed so as to have an identical shape to the first end plate 25.

The shaft 12 is passed through the shaft insertion aperture 30, and the second end plate 29 is fixed by press-fitting onto the shaft 12 from a second axial end such that the first surface faces toward the rotor core 13. The first surface of the second end plate 29 contacts a second axial end surface of the rotor core 13 such that the opening of the inlet flow channel 31 is closed. The coolant flow channels 17 and the linking flow channels 18 that are formed on the rotor core 13 are connected to the inlet flow channel 31. The second discharging channels 32 are positioned radially outside each of the coolant flow channels 17.

The shaft 12 includes: an in-shaft flow channel 33 that passes axially through a central position; and branching flow channels 34 that each branch off radially from the in-shaft flow channel 33, and that link between the in-shaft flow channel 33 and the inlet flow channel 27 that is formed on the first end plate 25.

Supply piping 36 connects a discharging orifice of an external oil pumping mechanism 35 that constitutes a coolant supplying means and an inlet of the in-shaft flow channel 33 of the shaft 12. Return piping 37 connects an oil pan 38 that is mounted below the frame 4 and an outlet of the in-shaft flow channel 33 of the shaft 12 with a suction orifice of the external oil pumping mechanism 35.

An embedded permanent magnet rotary electric machine 100 that is configured in this manner operates as an eight-pole, twelve-slot inner-rotor synchronous motor when electricity is supplied to the stator coil 3 from an external electric power supply, for example.

When the external oil pumping mechanism 35 is driven, cooling oil is conveyed under pressure through the supply piping 36 to the in-shaft flow channel 33, and flows through the branching flow channels 34 into the inlet flow channel 27, as indicated by arrows in FIG. 1. The cooling oil that has flowed into the inlet flow channel 27 flows radially outward through the inlet flow channel 27, and flows into the coolant flow channels 17 and the linking flow channels 18. The cooling oil that has flowed into the coolant flow channels 17 and the linking flow channels 18 flows through the coolant flow channels 17 and the linking flow channels 18 toward the second axial end, absorbing heat from the permanent magnets 20, and is discharged from the second discharging channels 32. The cooling oil that has been discharged from the second discharging channels 32 is scattered by centrifugal force, contacts the rear-end coil ends of the stator coil 3, absorbing heat from the stator coil 3, and is collected in the oil pan 38.

A portion of the cooling oil that has flowed radially outward through the inlet flow channel 27 is discharged from the first discharging channels 28. The cooling oil that has been discharged from the first discharging channels 28 is scattered by centrifugal force, contacts the front-end coil ends of the stator coil 3, absorbing heat from the stator coil 3, and is collected in the oil pan 38.

The cooling oil that has been collected in the oil pan 38 is returned to the external oil pumping mechanism 35 through the return piping 37 together with cooling oil that is discharged from the outlet of the in-shaft flow channel 33 of the shaft 12.

According to Embodiment 1, the coolant flow channels 17 are formed so as to pass axially through the rotor core 13 radially inside the magnet housing apertures 16, and communicate with the magnet housing apertures 16 over an entire axial length by means of the linking flow channels 18. The outside wall surfaces 20a of the permanent magnets 20 are fixed adhesively to the outside wall surfaces 16a of the magnet housing apertures 16. Thus, because cooling oil that flows through the coolant flow channels 17 contacts the inside wall surfaces 20b of the permanent magnets 20 directly, the permanent magnets 20 can be cooled effectively.

The adhesive 22 that fixes the permanent magnets 20 is applied only between the outside wall surfaces 20a of the permanent magnets 20 and the outside wall surfaces 16a of the magnet housing apertures 16. Thus, usage of the adhesive 22 is reduced, enabling costs to be reduced. Because the cross-sectional area of the magnet housing apertures 16 can be reduced in proportion to the reduction in the amount of adhesive 22, distances between the permanent magnets 20 and the inner wall surfaces of the magnet housing apertures 16 are shortened, suppressing increases in magnetoresistance between the permanent magnets 20 and the rotor core 13. Reductions in the amount of magnetic flux from the permanent magnets 20 that result from increases in magnetoresistance can thereby be suppressed, enabling torque reduction to be suppressed.

The cross-sectional area of the permanent magnets 20 can be increased by an amount proportionate to the reduction in the amount of adhesive 22. Thus, the amount of magnetic flux from the permanent magnets 20 can be increased, enabling increased torque to be achieved.

The shaft 12 includes: an in-shaft flow channel 33 that passes axially through a central position; and branching flow channels 34 that each branch off radially from the in-shaft flow channel 33, and that link between the in-shaft flow channel 33 and the inlet flow channel 27 that is formed on the first end plate 25. Thus, centrifugal forces that act on the cooling oil during rotation of the rotor 11 become driving forces that supply the cooling oil from the branching flow channels 34 to the inlet flow channels 27. The cooling oil is thereby supplied to the coolant flow channels 17 stably, enabling the permanent magnets 20 to be cooled effectively.

The first end plate 25 and the second end plate 29 are produced so as to have identical shapes. Thus, the first end plate 25 can also function as a second end plate 29, enabling the number of parts to be reduced.

The first end plate 25 includes first discharging channels 28 that link between an outer circumferential portion of the inlet flow channel 27 and a second surface side of the first end plate 25. Thus, because a portion of the cooling oil that flows through the inlet flow channel 27 is discharged from the first discharging channels 28, and is sprayed onto the front-end coil ends of the stator coil 3 due to centrifugal force, temperature increases in the stator coil 3 can be suppressed.

The second end plate 29 includes second discharging channels 32 that link between an outer circumferential portion of the inlet flow channel 31 and a second surface side of the second end plate 29. Thus, because the cooling oil that has flowed through the coolant flow channels 17 is discharged from the second discharging channels 32, and is sprayed onto the rear-end coil ends of the stator coil 3 due to centrifugal force, temperature increases in the stator coil 3 can be suppressed.

Now, to allow for magnetic saturation, it is preferable to form the linking flow channels 18 such that the flow channel width δ satisfies Expression 1. That is, by designing the linking flow channels 18 such that the flow channel width δ satisfies Expression 1, the linking flow channels 18 can be formed without giving rise to magnetic saturation.

$$\delta \leq A \times (1 - Br/Bs) \quad \text{(Expression 1)}$$

Here, Br is the residual magnetic flux density of the permanent magnets, and Bs is the saturated magnetic flux density of the rotor core.

Moreover, in Embodiment 1 above, inlet flow channels 27 and 31 are formed by hollowing out first surfaces of the first end plate 25 and the second end plate 29 to a constant depth so as to leave outer circumferential edge portions thereof, but inlet flow channels may be configured such that sixteen flow channel grooves that are formed on first surfaces of a first end plate and a second end plate so as to each have groove directions oriented in a radial direction, and so as to extend from the shaft insertion apertures to a vicinity of the outer circumferential edges, are arranged at a uniform pitch in a circumferential direction. In that case, first discharging channels and second discharging channels should be formed so as to pass through the first end plate and the second end plate so as to link between an outer circumferential portion of each of the flow channel grooves and the second surface sides of the first end plate and the second end plate.

In Embodiment 1 above, the coolant flow channels 17 are formed away from the magnet housing apertures 16 radially inside the magnet housing apertures 16, and the linking flow channels 18 are formed so as to link the magnet housing apertures 16 and the coolant flow channels 17, but coolant flow channels may be formed such that portions of coolant flow channels that have a circular cross section overlap with the magnet housing apertures. In that case, chord portions of the circular cross sections of the coolant flow channels that intersect with the magnet housing apertures constitute linking flow channels.

In Embodiment 1 above, the coolant flow channels 17 are formed so as to have circular cross sections, but the cross section of the coolant flow channel is not limited to a circular shape, and may be an elliptical shape, a triangular shape, or a rhombic shape, for example. If the cross section of a coolant flow channel is an elliptical shape, for example, the coolant flow channel is formed radially inside a magnet housing aperture such that the major axis of the elliptical shape is parallel to the width direction of the magnet housing aperture, and a major axial length of the elliptical shape constitutes the maximum flow channel width X of the magnet housing aperture. If the cross section of a coolant flow channel is a triangular shape, the coolant flow channel is formed radially inside a magnet housing aperture such that the base side of the triangular shape is parallel to the width direction of the magnet housing aperture and such that a vertex is directed toward the magnet housing aperture, and a length of the base side constitutes the maximum flow channel width X of the magnet housing aperture. If the cross section of a coolant flow channel is a rhombic shape, the coolant flow channel is formed radially inside a magnet housing aperture such that a diagonal of the rhombic shape is parallel to the width direction of the magnet housing aperture, and a length of the diagonal of the rhombic shape constitutes the maximum flow channel width X of the magnet housing aperture.

In Embodiment 1 above, only single coolant flow channels 17 are formed radially inside the magnet housing apertures 16, but the coolant flow channels may be plural in number. For example, three coolant flow channels may be formed radially inside the magnet housing apertures 16 so as to be separated from each other in a width direction, and the three coolant flow channels and the magnet housing apertures each linked by a linking flow channel. In that case, the occurrence of magnetic saturation can be prevented if the three linking flow channels are designed such that a total sum (Σδ) of the flow channel width δ of the three linking flow channels that link the three coolant flow channels and the magnet housing aperture satisfies Expression 1 above.

In Embodiment 1 above, the permanent magnets 20 are divided into six magnet blocks 21 in an axial direction, but permanent magnets may be configured into an integrated body in which six magnet blocks are joined together.

Embodiment 2

Figure 4:
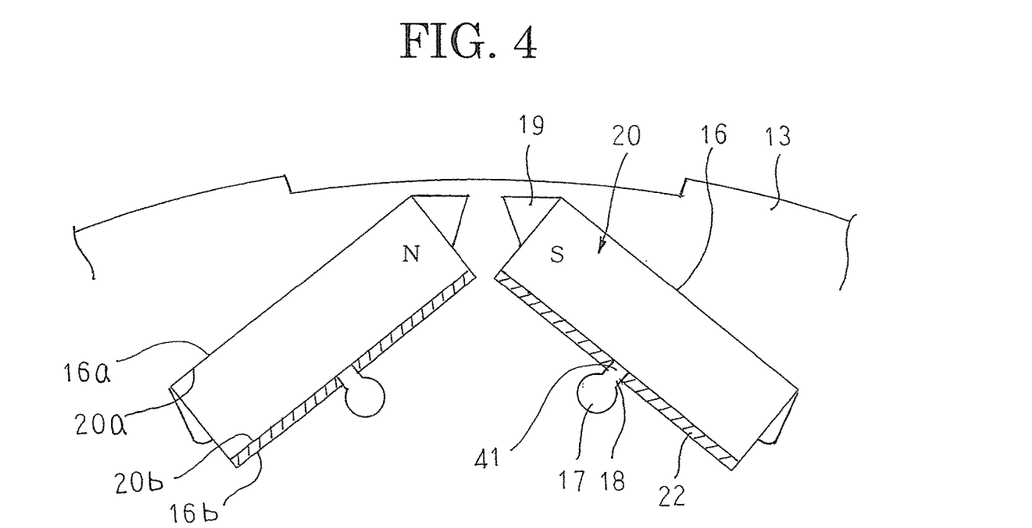
FIG. 4 is a partially enlarged end elevation that shows a rotor core in an embedded permanent magnet rotary electric machine according to Embodiment 2 of the present invention.

FIG. 4 is a partially enlarged end elevation that shows a rotor core in an embedded permanent magnet rotary electric machine according to Embodiment 2 of the present invention.

In FIG. 4, an adhesive 22 that is applied to inside wall surfaces 20b is hardened so as to form air gaps that extend from a first axial end to a second axial end of the rotor core 13 at ends of the linking flow channels 18 near the magnet housing apertures 16 to form auxiliary coolant flow channels 41.

Moreover, the rest of the configuration is formed in a similar or identical manner to that of Embodiment 1 above.

In Embodiment 2, the permanent magnets 20 are inserted into the magnet housing apertures 16, to the inside wall surfaces 20b of which the adhesive 22 has been applied. Then, before the adhesive 22 is hardened, auxiliary coolant flow channel forming molds (not shown) that are inserted inside the coolant flow channels 17 are projected into the magnet housing apertures 16 through the linking flow channels 18, and the permanent magnets 20 are pressed against the outside wall surfaces 16a. After the adhesive 22 is hardened, the auxiliary coolant flow channel forming molds are pulled out. The auxiliary coolant flow channels 41, which are surrounded by the inside wall surfaces 20b of the permanent magnets 20 and the adhesive 22, are formed thereby. These auxiliary coolant flow channels 41 are linked to the coolant flow channels 17 by means of the linking flow channels 18.

Thus, the inside wall surfaces 20b of the permanent magnets 20 are exposed inside the auxiliary coolant flow channels 41, and the cooling oil that flows through the coolant flow channels 17 and the linking flow channels 18 also flows through the auxiliary coolant flow channels 41 and contacts the permanent magnets 20. The adhesive 22 that fixes the permanent magnets 20 is applied only between the inside wall surfaces 20b of the permanent magnets 20 and the inside wall surfaces 16b of the magnet housing apertures 16. Consequently, similar or identical effects to those of Embodiment 1 above can also be achieved in Embodiment 2.

Embodiment 3

Figure 5:
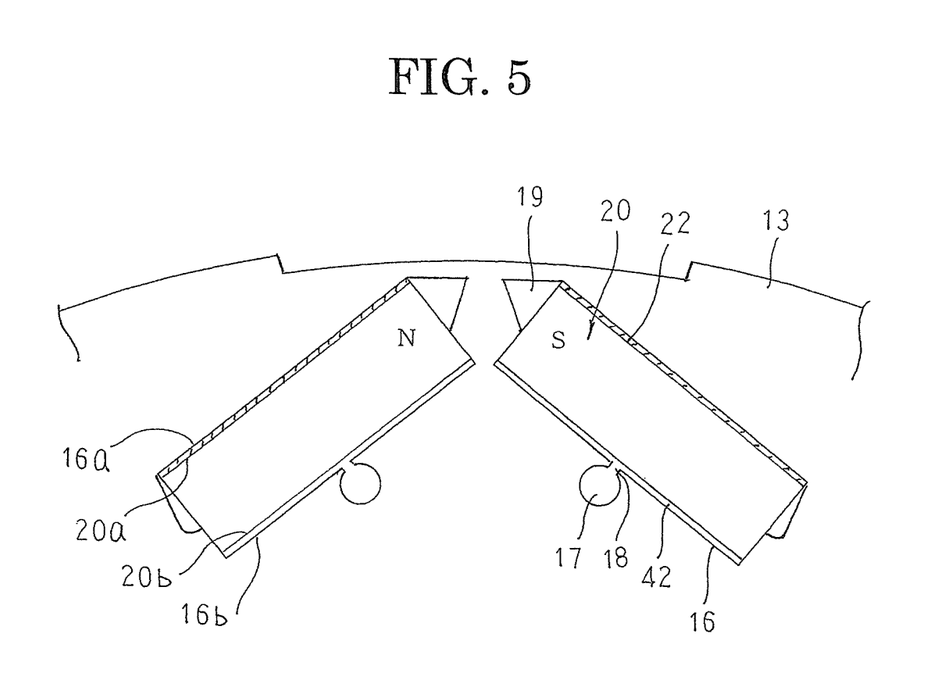
FIG. 5 is a partially enlarged end elevation that shows a rotor core in an embedded permanent magnet rotary electric machine according to Embodiment 3 of the present invention.

FIG. 5 is a partially enlarged end elevation that shows a rotor core in an embedded permanent magnet rotary electric machine according to Embodiment 3 of the present invention.

In FIG. 5, permanent magnets 20 are mounted to magnet housing apertures 16 such that outside wall surfaces 20a are fixed to outside wall surfaces 16a using an adhesive 22. Gaps 42 are formed between inside wall surfaces 20b of the permanent magnets 20 and inside wall surfaces 16b of the magnet housing apertures 16.

Moreover, the rest of the configuration is formed in a similar or identical manner to that of Embodiment 1 above.

In Embodiment 3, the permanent magnets 20 are inserted into the magnet housing apertures 16, to the outside wall surfaces 20a of which the adhesive 22 has been applied, and before the adhesive 22 is hardened, the rotor 11 is rotated. The permanent magnets 20 are thereby pressed against the outside wall surfaces 16a due to centrifugal forces, forming the gaps 42 between the inside wall surfaces 20b and 16b. The gaps 42 are maintained by hardening of the adhesive 22.

According to Embodiment 3, the cooling oil that flows through the coolant flow channels 17 flows into the gaps 42 between the inside wall surfaces 20b and 16b through the linking flow channels 18. The contact area between the cooling oil and the permanent magnets 20 is increased thereby, enabling the permanent magnets 20 to be cooled effectively.

Embodiment 4

Figure 6:
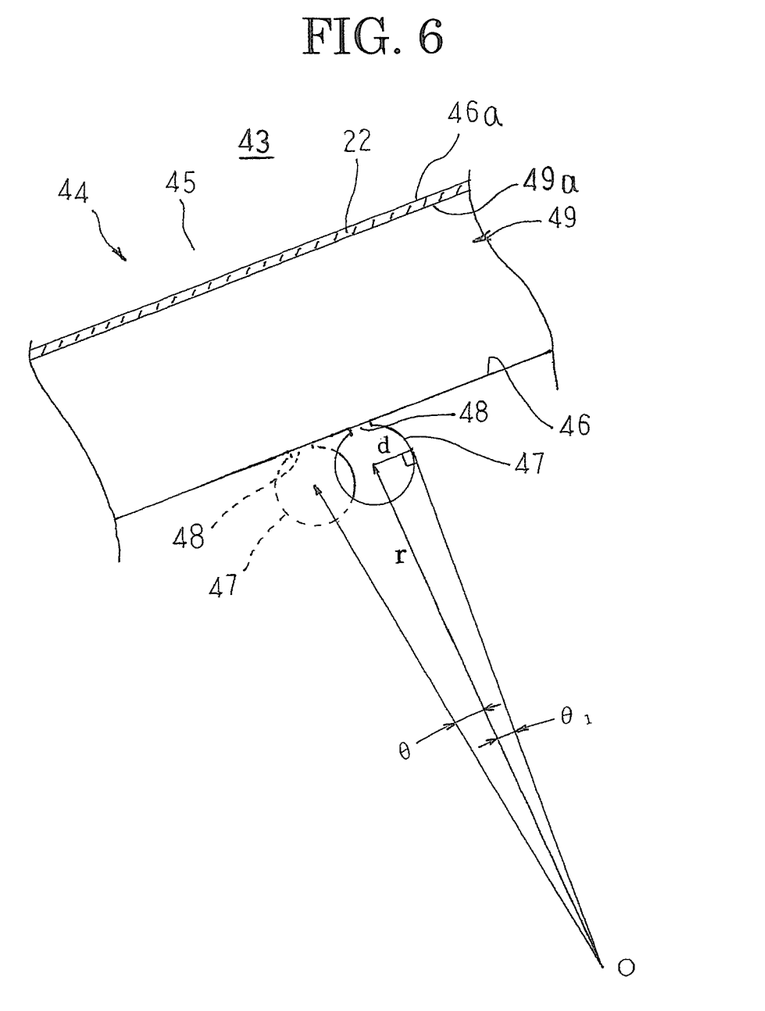
FIG. 6 is a partially enlarged end elevation that shows a rotor core in an embedded permanent magnet rotary electric machine according to Embodiment 4 of the present invention.

FIG. 6 is a partially enlarged end elevation that shows a rotor core in an embedded permanent magnet rotary electric machine according to Embodiment 4 of the present invention.

In FIG. 6, a rotor core 44 includes two core blocks 45 that are produced so as to have identical shapes. The core blocks 45 are configured in a similar or identical manner to that of the rotor core 13 except that the axial thickness thereof is half. The rotor core 44 is configured by stacking and integrating the first core block 45 and the second core block 45 in an axial direction such that the first core block 45 is rotated relative to the second core block 45 by a step skew angle θ (a mechanical angle) around a central axis in a first circumferential direction. In other words, permanent magnets 49 that are housed in magnet housing apertures 46 of the core blocks 45 are configured into two steps in the axial direction, and a step skew angle θ is disposed between the two steps of the permanent magnets 49 in the circumferential direction of the rotor core 44.

Now, if a distance between centers of the coolant flow channels 47 and the central axes of the core blocks 45 is r, and the maximum flow channel width of the coolant flow channels 47 is set to half, then the step skew angle θ is set so as to satisfy Expression 2. Moreover, because the coolant flow channels 47 have circular cross sections, d is a radius of the coolant flow channels 47.

$$\theta < \{\sin^{-1}(d/r)\} \times 2 \qquad \text{(Expression 2)}$$

In Embodiment 4, because the step skew angle θ is set so as to satisfy Expression 2, portions of the coolant flow channels 47 of the two core blocks 45 overlap with each other when viewed from the axial direction. Thus, the coolant flow channels 47 of the two core blocks 45 are connected in the axial direction, constituting coolant flow channels that extend from the first axial end to the second axial end of the rotor core 44.

The permanent magnets 49 are mounted to the core blocks 45 so as to be fixed to the outside wall surfaces 46a of the magnet housing apertures 46 using an adhesive 22.

In a rotor 43 that is configured in this manner, permanent magnets 49 are disposed in two steps in the axial direction, and a step skew angle θ is disposed between the steps of the permanent magnets 49 in the circumferential direction of the rotor core 44. Thus, cogging torque can be reduced.

The step skew angle θ (the mechanical angle) is set so as to satisfy Expression 2. Thus, portions of the coolant flow channels 47 of the two core blocks 45 overlap with each other when viewed from the axial direction, constituting coolant flow channels that extend from the first axial end to the second axial end of the rotor core 44. The cooling oil that flows through the coolant flow channels thereby flows into the linking flow channels 48, contacts the permanent magnets 49, and cools the permanent magnets 49. In addition, the adhesive 22 that fixes the permanent magnets 49 is applied only between the outside wall surfaces 49a of the permanent magnets 49 and the outside wall surfaces 46a of the magnet housing apertures 46. Consequently, similar or identical effects to those of Embodiment 1 above can also be achieved in Embodiment 4.

Moreover, in Embodiment 4 above, the permanent magnets 49 are disposed in two steps, and a step skew angle θ is disposed in the circumferential direction of the rotor core 44 between the steps of the permanent magnets, but the permanent magnets 49 may be disposed in three or more steps, and a step skew angle θ disposed in the circumferential direction of the rotor core 44 between each of the steps of the permanent magnets.

Embodiment 5

Figure 7:
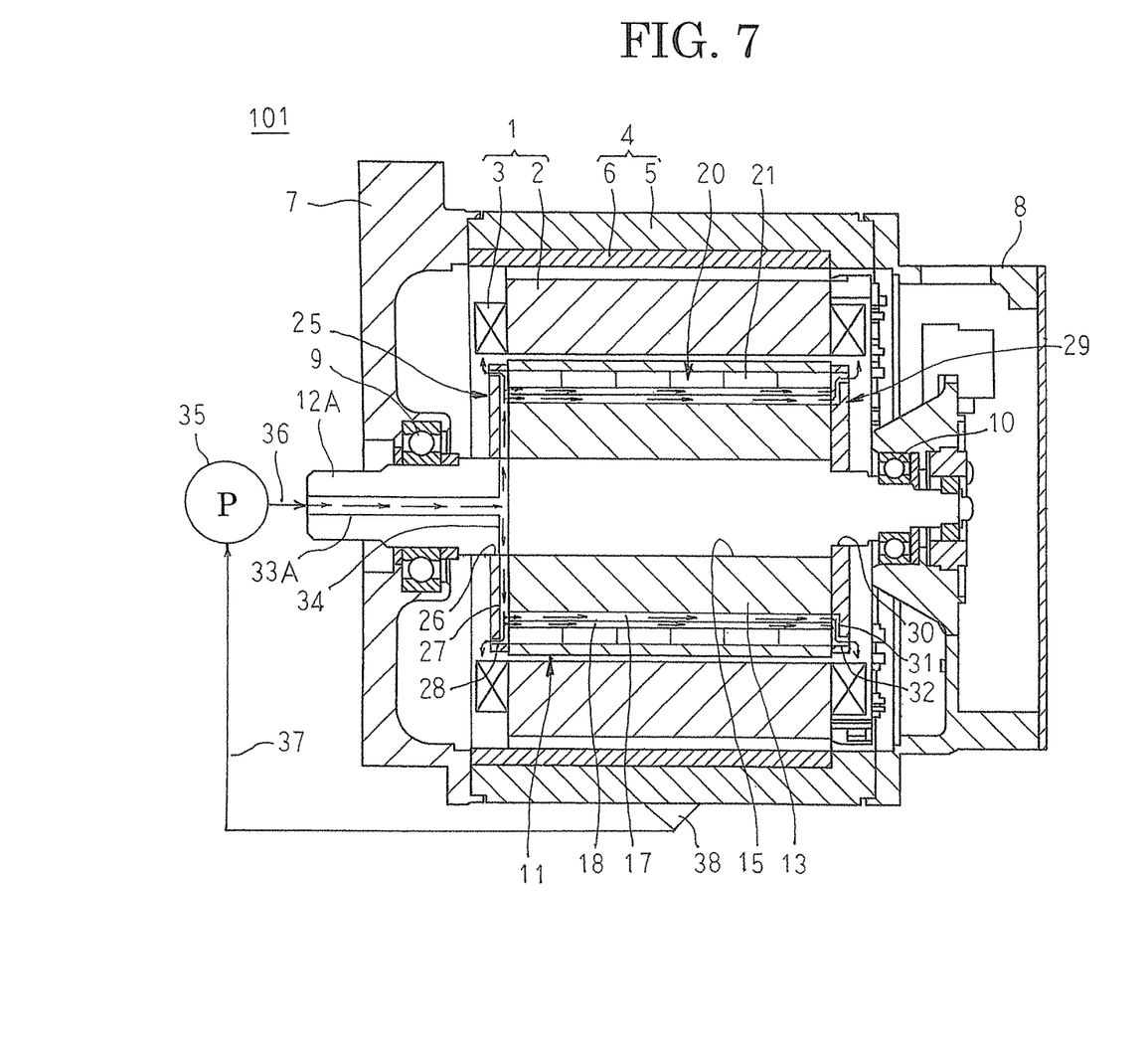
FIG. 7 is a cross section that shows an embedded permanent magnet rotary electric machine according to Embodiment 5 of the present invention.

FIG. 7 is a cross section that shows an embedded permanent magnet rotary electric machine according to Embodiment 5 of the present invention.

In FIG. 7, an in-shaft flow channel 33A is formed at a central axial position of a shaft 12A so as to extend from a first axial end to a position that is radially below an inlet flow channel 27 that is formed on a first end plate 25. Branching flow channels 34 are formed in the shaft 12A so as to communicate between a second axial end of the in-shaft flow channel 33A and the inlet flow channel 27.

Moreover, the rest of the configuration is formed in a similar or identical manner to that of Embodiment 1 above.

In an embedded permanent magnet rotary electric machine 101 that is configured in this manner, because the in-shaft flow channel 33A is formed only on the front end of the shaft 12A, costs for the shaft 12A can be reduced.

Moreover, in each of the above embodiments, cases in which a rotary electric machine has been applied to an electric motor have been explained, but similar or identical effects are also exhibited if the rotary electric machine is applied to a generator.

In each of the above embodiments, an eight-pole, twelve-slot rotary electric machine has been explained, but it goes without saying that the number of poles and the number of slots are not limited to eight poles and twelve slots.

In each of the above embodiments, pairs of permanent magnets that constitute magnetic poles are disposed in V shapes that open radially outward from a shaft, but arrangement of the permanent magnets is not limited thereto. For example, the respective permanent magnets may also be disposed at a uniform angular pitch circumferentially such that the permanent magnets contact an identical cylindrical surface to constitute magnetic poles.

In each of the above embodiments, the permanent magnets are produced so as to have a cross section perpendicular to an axial direction of a shaft that is a rectangular shape, but the cross section of the permanent magnets is not limited to a rectangular shape, and may be a circular arc shape that is curved into a circular arc, for example. In that case, the magnet housing apertures are formed so as to have a cross-sectional shape that conforms to the cross-sectional shape of the permanent magnets.

The invention claimed is:

1. An embedded permanent magnet rotary electric machine comprising:
   a stator comprising:
   an annular stator core; and
   a stator coil that is mounted to said stator core; and
   a rotor comprising:
   a rotor core that is configured by laminating and integrating electromagnetic steel sheets, and that is fixed to a shaft so as to be disposed rotatably inside said stator core;
   a plurality of permanent magnet housing apertures that are disposed circumferentially so as to be respectively formed so as to pass axially through an outer circumferential side of said rotor core; and
   permanent magnets that are housed in each of said magnet housing apertures,
   wherein:
   at least one coolant flow channel is formed so as to pass axially through said rotor core radially inside said magnet housing apertures;
   a linking flow channel is formed so as to have a flow channel width that is narrower than a maximum flow channel width of said coolant flow channel, so as to link said coolant flow channel and said magnet housing apertures, and so as to pass axially through said rotor core; and
   said permanent magnets are fixed to an inner wall surface of said magnet housing apertures by an adhesive that is disposed only between a wall surface of said permanent magnets that is positioned on a radially inner side or a radially outer side of said permanent magnets and said inner wall surface of said magnet housing apertures so as to expose a region of a wall surface of said permanent magnets that is positioned on a radially inner side that faces said linking flow channel.

2. The embedded permanent magnet rotary electric machine according to claim 1, wherein said linking flow channel is formed such that a total sum $\Sigma\delta$ of flow channel width satisfies:

$$\Sigma\delta \leq A \times (1 - Br/Bs),$$

where $\delta$ is a flow channel width of said linking flow channel, A is a width of said magnet housing apertures, Br is a residual magnetic flux density of said permanent magnets, and Bs is a saturated magnetic flux density of said rotor core.

3. The embedded permanent magnet rotary electric machine according to claim 1, wherein:
   said permanent magnets are fixed by said adhesive between a wall surface of said permanent magnets that is positioned on a radially inner side and said inner wall surface of said magnet housing apertures such that a wall surface of said permanent magnets that is positioned on a radially outer side and said inner wall surface of said magnet housing apertures contact each other; and
   an auxiliary coolant flow channel is formed so as to be surrounded by said adhesive and a region of said wall surface of said permanent magnets that is positioned on a radially inner side that faces said linking flow channel, so as to link to said linking flow channel.

4. The embedded permanent magnet rotary electric machine according to claim 1, wherein:
   said permanent magnets are fixed by said adhesive between a wall surface of said permanent magnets that is positioned on a radially outer side and said inner wall surface of said magnet housing apertures;
   a gap is formed between a wall surface of said permanent magnets that is positioned on a radially inner side and said inner wall surface of said magnet housing apertures; and
   said gap is linked to said coolant flow channel by means of said linking flow channel.

5. The embedded permanent magnet rotary electric machine according to any one of claim 1, wherein:
   said permanent magnets are configured into a plurality of steps in an axial direction such that a step skew angle $\theta$ is disposed in a circumferential direction of said rotor core between each of said steps of said permanent magnets; and
   said step skew angle $\theta$ satisfies:

$$\theta < \{\sin^{-1}(d/r)\} \times 2$$

where d is half a maximum flow channel width of said coolant flow channel, and r is a distance between a central axis of said rotor core and a center of said coolant flow channel.

6. The embedded permanent magnet rotary electric machine according to claim 1, further comprising an end plate that is fixed to said shaft, which is inserted into a shaft insertion aperture, said end plate being disposed so as to contact a first axial end surface of said rotor core,
   an inlet flow channel being formed on said end plate so as to link said shaft insertion aperture and said coolant flow channel, and
   said shaft having:
   an in-shaft flow channel that is formed so as to pass axially through a central position; and branching flow channels that branch off radially from said in-shaft flow channel, and that are formed so as to link said in-shaft flow channel and said inlet flow channel.

7. The embedded permanent magnet rotary electric machine according claim 1, further comprising an end plate that is fixed to said shaft, which is inserted into a shaft insertion aperture, said end plate being disposed so as to contact a first axial end surface of said rotor core,
- an inlet flow channel being formed on said end plate so as to link said shaft insertion aperture and said coolant flow channel, and
- said shaft having:
- an in-shaft flow channel that is formed through a central position so as to extend from a first axial end to a lower end position of said end plate; and
- branching flow channels that branch off radially from said in-shaft flow channel, and that are formed so as to link said in-shaft flow channel and said inlet flow channel.

\* \* \* \* \*